Oct. 10, 1933.    J. H. CANSDALE    1,930,338
CONTROL SYSTEM
Filed April 6, 1933
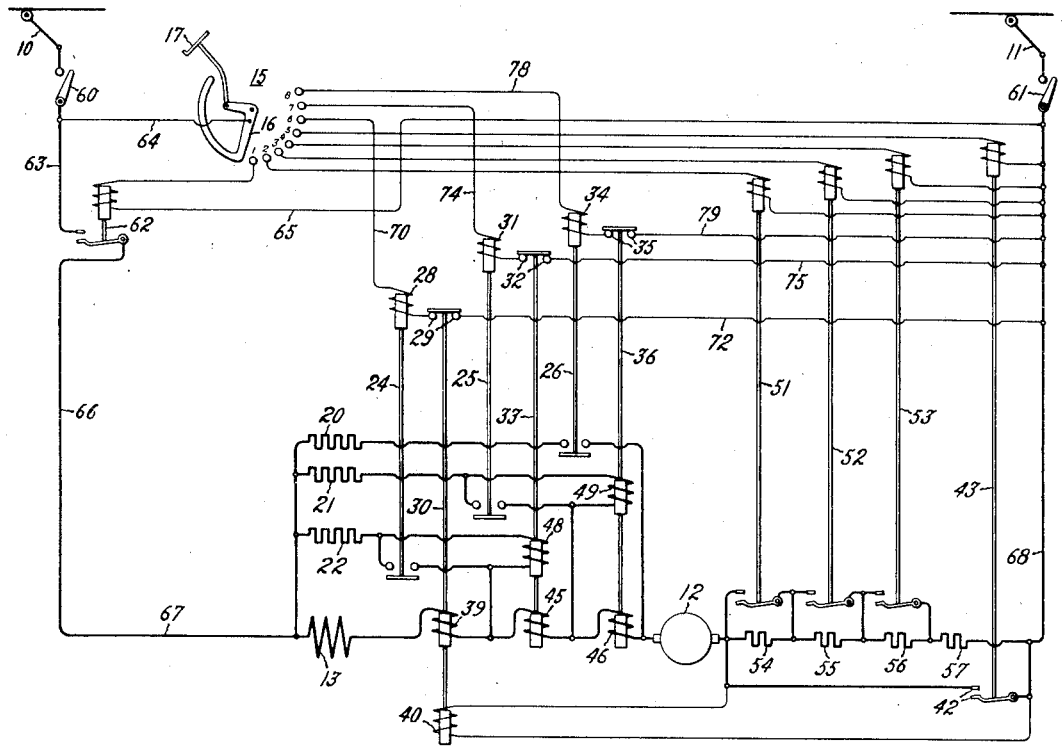
Inventor:
John H. Cansdale,
by [signature]
His Attorney.

Patented Oct. 10, 1933

1,930,338

UNITED STATES PATENT OFFICE 1,930,338

CONTROL SYSTEM

John H. Cansdale, Rugby, England, assignor to General Electric Company, a corporation of New York Application April 6, 1933, Serial No. 664,737, and in Great Britain April 30, 1932

8 Claims. (Cl. 172—179)

My invention relates to control systems for electric vehicles embodying a motor having a series connected field winding, and has for an object the provision of a simple and efficient system for controlling the rate of acceleration of the motor.

In starting electric vehicles, it is desirable to have as strong a field as possible to obtain the maximum accelerating torque with a small current. A strong magnetic field results in a low full running speed so that field shunting is necessary in order to obtain the required maximum speed of the vehicle. By using a motor with a very strong series field at starting there is also a considerable saving in starting resistance loss since the current required for acceleration with a strong field is correspondingly less. In order to obtain approximately constant accelerating torque, it is desirable that the average current during acceleration be controlled so that it increases an amount sufficient to compensate for the decrease in the field strength during the field shunting.

It is a further object of my invention to control automatically the relation between the armature current and the field strength so as to produce substantially constant accelerating torque during the acceleration of the motor.

In accordance with my invention in one form thereof, I provide a motor control system wherein the motor is accelerated a predetermined amount under full field excitation, and thereafter is accelerated through a series of steps by the reduction of the field excitation, the torque of the motor being maintained substantially constant. More specifically, I provide in addition to the accelerating resistors, variable shunt connections for the motor field winding, the shunt connections being controlled in accordance with the motor current whereby a smooth rate of acceleration is obtained and the motor is protected against excessive values of current.

For a more complete understanding of my invention, reference should now be had to the drawing wherein I have shown diagrammatically my invention applied to the control of a trolley bus.

It is believed that a clear understanding of the arrangement and operation of the various parts of the system will be best understood from a complete description of the operation of the system as a whole; therefore, the construction and arrangement of certain of the devices only, will be described first in detail.

Referring now to the drawing, I have shown my invention in one form as applied to the control of a trolley bus (not shown) in which current is supplied from the trolleys 10 and 11 to its driving motor 12 having a series field winding 13. A foot-operated master controller 15 is provided with a movable contact member 16 arranged to be operated by a foot pedal 17 through a plurality of circuit controlling positions.

There is associated with the series field winding 13, the resistors 20, 21 and 22 which are arranged to be connected in parallel circuit relation with the series field winding by the closing of the contactors 24, 25 and 26. The operating coil 28 of the contactor 24 is connected through the interlock contacts 29 of a relay 30. Similarly, the operating coil 31 of the contactor 25 is connected through the interlock contacts 32 of the relay 33, while the operating coil 34 of contactor 26 is connected through the interlock contacts 35 of the relay 36. The relay 30 is provided with a coil 39 connected in series circuit relation with the motor 12 and a second coil 40 is connected across the contacts 42 of a contactor 43. The relays 33 and 36 are similarly provided with series coils 45 and 46. The relay 33 is also provided with a second coil 48 connected across the contacts of the contactor 24. The relay 36 is provided with a second coil 49 connected across the contacts of the contactor 25.

The interlock contacts 29, 32 and 35 of the relays 30, 33 and 36 are normally closed but under suitable conditions of current in the two operating coils of the respective relays each relay will operate to open its contacts, and at a predetermined value of current each relay will operate to close its contacts. The accelerating contactors 51, 52, 53 and 43 are arranged to control respectively the resistors 54, 55, 56 and 57 connected in series circuit relation with the motor 12.

It is now believed that a comprehensive understanding of the invention including the construction and arrangement of the various apparatus, as well as its operation, will be facilitated by the description of the operation of the system as a whole.

In the operation of my invention in the form shown, it will be assumed that the line switches 60 and 61 are closed to connect the trolley bus to the trolleys 10 and 11 and that the pedal 17 has been depressed to operate the movable contact 16 into its first position. An energizing circuit is completed for the contactor 62 through a circuit which may be traced from the trolley 10, by line switch 60, conductors 63 and 64, movable contact member 16, operating coil of the contactor 62, conductor 65, and by line switch 61 to the other trolley 11. Consequent to the closing of the line contactor 62 the motor is energized through a circuit which may be traced from the trolley 10, by line switch 60, conductor 63, contactor 62, conductors 66 and 67, series field winding 13, series coils 39, 45 and 46 of the relays 30, 33 and 36, armature of the motor 12, accelerating resistors 54, 55, 56 and 57 and by conductor 68 and the line switch 61 to the other trolley 11. The current flowing through the series coils 39, 45 and 46 and their respective relays operates the relays to open their respective contacts 29, 32 and 35. The operating force produced by the series coil 39 of the relay 30 is assisted by the coil 40 connected in parallel circuit relation with the accelerating resistors.

Further depression of the master controller pedal 17 to its second, third, fourth and fifth accelerating positions completes energizing circuits for the operating coils of the contactors 51, 52, 53 and 43, which contactors operate in sequence to short circuit the accelerating resistors 54 to 57, inclusive. The closing of the contactor 43 also short-circuits the coil 40 of the relay 30. The motor 12 thereby accelerates to a speed determined by the strength or intensity of the flux produced by the series field winding 13 and the load on the bus. In the sixth accelerating position an energizing circuit is completed by the controller 15 for the operating coil 28 of the contactor 24 providing the contacts 29 of the relay 30 are closed. This circuit may be traced from the trolley 10 by the line switch 60, conductors 63 and 64, contact member 16, conductor 70, operating coil 28, interlock contacts 29 and by conductors 72 and 68 and by line switch 61 to the other trolley 11. As soon as the motor current drops to a predetermined value the relay contacts 29 are closed. The contactor 24 is thereupon operated to short-circuit the coil 48 of the relay 33. The contactor 24 also connects the resistor 22 in shunt circuit relation with the series field winding 13 thereby decreasing the excitation of the field winding and producing additional acceleration of the motor 12.

Whether or not the relay 33 is operated to close its contacts 32 depends upon the magnitude of the motor current flowing through its series coil 45. If the current is below a predetermined amount, the contacts 32 of this relay will close, thus preparing the circuit for the closing of the contactor 25.

The next or seventh accelerating step is obtained by connecting the resistance 21 in shunt with the series field winding 13. Now assuming that the foot pedal 17 has operated the movable contact member 16 to its seventh position, it will be observed that energization of the contactor 25 will depend upon the position of the relay 33. As soon as the motor current flowing through the series coil 45 of this relay is reduced to a predetermined value, the contacts 32 will be closed to complete the energizing circuit for the coil 31 of the contactor 25. This circuit may be traced from trolley 10, by line switch 60, conductors 63 and 64, movable contact member 16, conductor 74, operating coil 31, interlock contacts 32, conductors 75 and 68 and by line switch 61 to the other trolley 11.

The closing of the contactor 25 connects the resistor 21 in shunt with the series field winding 13 and also short-circuits the coil 49 of the relay 36, thus leaving the relay 36 under the control of its series coil 46 which at a predetermined value of current operates to close its interlock contacts 35. As soon as the movable contact member 16 is operated to its eighth accelerating position, an energizing circuit for the operating coil 34 of the contactor 36 may be traced from the trolley 10, by line switch 60, conductors 63 and 64, contact member 16, conductor 78, operating coil 34 of the contactor 26, interlock contacts 35, conductors 79 and 68, and by line switch 61 to the trolley 11. Consequent to the closing of the contactor 26, the resistance 20 is connected in shunt circuit relation with the series field winding 13 to accelerate the motor to its high speed.

As I have already stated, in order to maintain a constant accelerating torque, it is necessary to allow the average accelerating current to be of increasing magnitude during the field shunting positions to compensate for the decrease in field excitation. Therefore, the relays are adjusted by varying the ampere turns or by providing adjusting springs so that the operating current of the relay 36 is higher than the relay 33 and the operating current of the relay 33 is higher than the relay 30.

It will, therefore, be seen that the function of the shunt coils 40, 48 and 49 of the respective relays is very important inasmuch as each coil prevents a relay from operating until the one prior to it has operated to short-circuit the next shunt coil. In other words, these coils are locking coils which cause the relays 30, 33 and 36 to be operated in predetermined sequence.

These relays 30, 33 and 36 besides protecting the motor during acceleration also protect the motor during running, so that it is impossible at any time for the driver to abuse the motor on the field shunting positions. For example, if an abnormal current is taken by the motor when operating on a weak field position, position 8, then the relay corresponding to that position, relay 36, will operate to deenergize its related contactor, contactor 26, to strengthen the field and thereby reduce the motor current.

It will be understood that additional field shunting positions may be provided and that the system may be applied to any electrically propelled vehicle having one or more driving motors, each of the motors being provided with a series field winding.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In combination, a motor provided with a series field winding, field shunting means for reducing the strength of said field winding in a series of steps comprising a plurality of resistors and a plurality of relays responsive to the motor current for connecting in succession said resistors in shunt circuit relation with said field winding.

2. In combination, a motor provided with a series field winding, series accelerating resistors arranged to be short-circuited for controlling the energization of said motor after said series accelerating resistors have been short-circuited, field shunting means for reducing the strength of said field winding in a series of steps comprising a plurality of resistors and a plurality of relays responsive to the motor current for connecting in succession said resistors in shunt circuit relation with said field winding.

3. In combination, a direct current motor provided with a series field winding, a controller operable through a plurality of positions, accelerating resistors for said motors arranged to be successively short-circuited by said controller, a plurality of field shunting resistors, a plurality of relays for connecting said field resistors in shunt circuit relation with said field winding, means jointly responsive to the positoin of said controller and to the magnitude of said current for controlling the operation of said relays.

4. In combination, a direct current motor provided with a series field winding, a controller operable through a plurality of circuit controlling positions, a plurality of series resistors arranged to be short-circuited to accelerate said motor by operation of said controller through a predetermined number of said positions, a plurality of field shunting resistors, and a plurality of relays jointly responsive to operation of said controller beyond said predetermined number of positions and to the motor current for connecting said field resistors in shunt with said field winding.

5. In combination, a direct current motor provided with a series field winding, a controller operable through a plurality of circuit controlling positions, a plurality of series resistors arranged to be short-circuited to accelerate said motor by operation of said controller through a predetermined number of said positions, a plurality of field shunting resistors, a plurality of relays jointly responsive to operation of said controller beyond said predetermined number of positions and to the motor current for connecting said field resistors in shunt with said field winding, and means for causing the operation of said relays only in a predetermined sequence.

6. In combination, a direct current motor provided with a series field winding, series accelerating resistors for said motor, a controller operable through a plurality of positions for successively short-circuiting said resistors, a plurality of resistances, a plurality of contactors for connecting said resistances in shunt circuit relation with said series field winding, a plurality of relays for controlling the energization of said contactors, relay operating coils jointly responsive to the position of said controller and to the magnitude of the motor current for producing the successive connection of said resistors in shunt circuit relation with said series field winding.

7. In combination, a direct current motor provided with a series field winding, a controller operable through a plurality of circuit controlling positions, a plurality of resistors arranged to be short-circuited to accelerate said motor by operation of said controller through a predetermined number of said positions, a plurality of field shunting resistors, and means for connecting said resistors in shunt circuit relation with said field winding to cause the production of substantially constant torque by said motor comprising a plurality of relays jointly responsive to said controller and the motor current for connecting said resistances in shunt with said field winding, the successively operated relays being responsive to different values of motor current.

8. In combination, a trolley bus control comprising a direct current trolley driving motor provided with a series field winding, a plurality of series connected accelerating resistors for said motor, a controller, a pedal for operating said controller through a plurality of circuit controlling positions, said controller first operating to short-circuit successively said resistors, a plurality of field shunting resistors, a plurality of contactors for connecting said resistors in shunt circuit relation with said field winding, an operating coil for each contactor, a relay provided with a series coil responsive to motor current and a shunt coil for each contactor, the contacts of each relay being connected in series circuit relation with each of said contactor operating coils, the shunt coil of each relay being provided to insure sequential operation of said relays, and connections for completing energizing circuits for each of said relays as said controller is operated through predetermined circuit controlling positions, said series coils being arranged to permit after the first connection each additional shunting connection to be completed for large values of motor current so as to cause said motor to produce substantially constant torque.

JOHN H. CANSDALE.